US011339818B2

(12) United States Patent
Moody et al.

(10) Patent No.: US 11,339,818 B2
(45) Date of Patent: May 24, 2022

(54) EXTENSIBLE TELESCOPING MAST ASSEMBLY AND DEPLOYMENT MECHANISM

(71) Applicant: Eagle Technology, LLC, Melbourne, FL (US)

(72) Inventors: Brian A. Moody, Melbourne Beach, FL (US); Dana Monnier Rosennier, Palm Bay, FL (US); Kevin Szekely, Melbourne, FL (US); Gustavo A. Toledo, Rockledge, FL (US); Shaun Kapples, Sebastian, FL (US); Ryan Whitney, Indialantic, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 455 days.

(21) Appl. No.: 16/452,865

(22) Filed: Jun. 26, 2019

(65) Prior Publication Data

US 2020/0408235 A1    Dec. 31, 2020

(51) Int. Cl.
| | |
|---|---|
| *F16B 7/10* | (2006.01) |
| *H01Q 1/10* | (2006.01) |
| *F16M 11/04* | (2006.01) |
| *F16M 11/18* | (2006.01) |
| *H01Q 1/12* | (2006.01) |

(52) U.S. Cl.
CPC ............... *F16B 7/10* (2013.01); *H01Q 1/103* (2013.01); *F16M 11/046* (2013.01); *F16M 11/18* (2013.01); *H01Q 1/1235* (2013.01)

(58) Field of Classification Search
CPC ........ F16B 7/10; H01Q 1/103; H01Q 1/1235; F16M 11/046; F16M 11/18
See application file for complete search history.

(56) References Cited

U.S. PATENT DOCUMENTS

| 4,176,360 A | 11/1979 | Leavy et al. |
| 4,254,423 A | 3/1981 | Reinhard |
| 4,871,138 A | 10/1989 | Sauter |

(Continued)

FOREIGN PATENT DOCUMENTS

| EP | 2108586 A1 | 10/2009 | |
| EP | 3758138 A1 * | 12/2020 | ............. H01Q 1/103 |

OTHER PUBLICATIONS

European Search Report issued in European Patent Application No. 20177948 dated Nov. 16, 2020.

(Continued)

*Primary Examiner* — Anita M King
(74) *Attorney, Agent, or Firm* — Fox Rothschild LLP; Carol E. Thorstad-Forsyth; Robert J. Sacco (57) ABSTRACT

Extensible mast is comprised of multiple mast sections which are aligned along a mast axis. Each mast section is formed of an elongated tubular member disposed in a nested configuration when the mast is in a stowed condition. Each mast section is configured to slide along a direction aligned with the mast axis to facilitate a transition of the mast from the stowed condition to a deployed condition. In the deployed condition, adjacent mast sections are disposed substantially end to end so as to form a mast having an elongated length extending from a mast base to a mast tip. Mast sections includes one or more latches formed from a portion of the sidewall and resiliently engage a portion of an adjacent mast section.

21 Claims, 12 Drawing Sheets

(56) References Cited

U.S. PATENT DOCUMENTS

| | | | |
|---|---|---|---|
| 5,035,094 | A | 7/1991 | Legare |
| 5,101,215 | A | 3/1992 | Creaser, Jr. |
| 5,228,251 | A | 7/1993 | Frigon |
| 5,279,084 | A | 1/1994 | Atsukawa |
| 5,315,795 | A | 5/1994 | Chae et al. |
| 5,615,855 | A | 4/1997 | Marue et al. |
| 6,046,706 | A | 4/2000 | Vargas |
| 6,095,714 | A * | 8/2000 | Spencer .................. F16B 21/20 285/307 |
| 7,225,694 | B2 | 6/2007 | Said |
| 7,299,589 | B2 | 11/2007 | Campbell et al. |
| 8,522,511 | B2 | 9/2013 | Thoren et al. |
| 8,922,451 | B2 * | 12/2014 | Kardohely ........... H01Q 1/1235 343/883 |
| 10,955,212 | B2 * | 3/2021 | Bowman .................. F41A 25/00 |
| 2012/0015853 | A1 | 1/2012 | Ma et al. |
| 2012/0110927 | A1 | 5/2012 | Liestenfeltz et al. |
| 2019/0144139 | A1 | 5/2019 | Marks |

OTHER PUBLICATIONS

Northrop Grumman, The Value of Performance Business Ventures, "Telescopic Tube Masts, Deployable Structures for Space Applications," copyright 2019 Northrop Grumman Corporation, http://www.northropgrumman.com/BusinessVentures/AstroAerospace/Products/Pages/TelescopicTubeMasts.aspx.

Mobrem, M., et al., "Design and Performance of the Telescopic Tubular Mast," Proceedings of the 41st Aerospace Mechanisms Symposium, Jet Propulsion Laboratory, May 16-18, 2012 <http://www.northropgrumman.com/BusinessVentures/AstroAerospace/Documents/pageDocs/tech_papers/tech_papers_design.pdf>.

* cited by examiner

EXTENSIBLE TELESCOPING MAST ASSEMBLY AND DEPLOYMENT MECHANISM

BACKGROUND

Statement of the Technical Field

The technical field of this disclosure concerns extensible telescoping masts, and more particularly methods and systems for deploying same.

Description of the Related Art

The related art concerns methods and systems for high precision extensible telescoping masts and associated deployment mechanisms. Compact, low mass, extendable compressive structural members are needed for certain types of tension based deployable systems. For example, such masts can be employed to facilitate deployable antenna reflectors. Similarly, extendable booms are commonly needed in many space-based application to function as satellite offsets and/or deployed compressive members.

One type of deployable compressive structural member is a telescoping mast. Telescoping masts offer commonly comprise a plurality of tapered sections which are stowed coaxially in a nested configuration. The sections deploy by sliding in the axial direction so that individual sections are disposed substantially end to end. Such telescoping masts offer advantageous stowed packaging due to their nested configuration when not extended.

Another type of extensible deployable structural member is based on the concept of a slit-tube or Spoolable Extensible Member (SEM). A SEM function in a manner similar to conventional tape-measures which can be stored on a spool and deployed out into a rigid member. When in a planate state the SEM becomes flexible such that it can be rolled on a spool for efficient stowage. But SEMs are limited with regard to the degree of dimensional stability and deployed stiffness that they can provide. The limitations with respect to dimensional stability can be caused by thermo-elastic distortion and/or thermally accelerated creep. The limits on deployed stiffness can be particularly problematic with regard to pointing accuracy in the case of reflector antennas.

SUMMARY

This document concerns an extensible mast comprised of a plurality of mast sections which are coaxially aligned along a mast axis. Each mast section is formed of an elongated tubular member defined by a sidewall and disposed in a nested configuration with respect to others of the plurality of mast sections when the mast is in a stowed condition. Each mast section is configured to slide along a direction aligned with the mast axis. This sliding action facilitates a transition of the mast from the stowed condition to a deployed condition. In the deployed condition, adjacent mast sections are disposed substantially end to end so as to form a mast having an elongated length extending from a mast base to a mast tip. Each of the mast sections includes one or more latches. These latches are each formed from a portion of the sidewall that is configured to resiliently deflect to facilitate engagement of the latch with a portion of an adjacent mast section. The latches are configured to automatically secure a base end of each of the mast sections to a tip end of an adjacent mast section when the mast is transitioned to the deployed condition.

According to one aspect, each of the one or more latches can be configured to deflect in a direction transverse with respect to the mast axis. For example, in some implementations, the latches are configured to deflect in a radial direction with respect to the mast axis. Each latch can be comprised of a flexure member which is joined to a major portion of the sidewall at a flexure base thereof. The flexure member is cut away from the major portion of the sidewall along an elongated length thereof and has a tip end opposed from the base. In some implementations, the flexure member is oriented so that its elongated length from the flexure base to the tip end extends toward the mast base. Each latch also includes a nub disposed on a portion of the flexure member. The nub is advantageously configured to be received within an engagement recess defined in the adjacent mast section when the mast is in the deployed condition. Each mast section can also include at least one clocking groove. This clocking groove can be disposed in the sidewall and may extend in a direction substantially aligned with the mast axis. The clocking groove is configured to receive a clocking guide structure fixed in the adjacent mast section to prevent relative rotation of the mast sections about the mast axis.

The mast can also include a drive system which is configured to urge the mast sections from the stowed condition to the deployed condition. In some implementations, the drive system can be comprised of a spoolable extensible member (SEM). Consequently, the drive system can be configured to transition the SEM from the stowed condition in which the SEM is rolled on a spool to the deployed condition in which the SEM is unrolled from the spool. The SEM can be designed to have an elongated length that is tapered in width from a base end to a tip end. In such a scenario, the plurality of mast sections may each comprise a progressively smaller cross-section from the mast base to the mast tip. Consequently, the tapered width of the SEM allows the SEM to fit within each of the mast sections of progressively smaller cross-section. In some implementations, the SEM may be comprised of a first SEM and a second SEM. Further, the first SEM and the second SEMs can be configured to deploy concurrently to facilitate the transition from the stowed condition to the deployed condition.

If an SEM is used, the plurality of mast sections may each comprise one or more battens through which the SEM extends. Each of these battens can be a structural member which is fixed to the mast section and disposed transverse to the mast axis. The batten will include an aperture of a predetermined shape corresponding to a cross-sectional shape of the SEM when deployed. The battens are advantageous insofar as they can help minimize the potential for buckling of the SEM.

The mast described herein can be incorporated into a deployable tensioned structure wherein the mast is basically used as a compression member. In this regard, the mast can be configured to support column loading along the mast axis. In one example of such a deployable tensioned structure, a plurality of cords can be attached to the mast base and the mast tip, and the cords can be configured to support a flexible radio frequency reflector surface. In other scenarios, the mast can function as a boom that is configured to support a radio frequency reflector.

The solution described herein also concerns a method for deploying an extensible mast. The method can involve arranging a plurality of mast sections coaxially in alignment along a mast axis. Each mast section can comprise an elongated tubular member defined by a sidewall. The method can further involve disposing the plurality of mast sections in a nested configuration with respect to others of the plurality of mast sections when the mast is in a stowed condition. Thereafter, a drive system is used to urge each mast section to slide along a direction aligned with the mast axis. This operation facilitate a transition of the mast from the stowed condition to a deployed condition in which adjacent ones of the mast sections are disposed substantially end to end. Consequently, operation of the drive system will cause the plurality of mast sections to form a mast having an elongated length extending from a mast base to a mast tip. The method can continue with the actions which involve retaining the plurality of mast sections in the deployed condition. This function can involve using one or more latches, each of which is formed from a portion of the sidewall. The latches are configured to resiliently deflect to facilitate engagement of the latch with a portion of an adjacent mast section. The latches operate to automatically secure a base end of each of the mast sections to a tip end of an adjacent mast section when the mast is transitioned to the deployed condition.

BRIEF DESCRIPTION OF THE DRAWINGS

This disclosure is facilitated by reference to the following drawing figures, in which like numerals represent like items throughout the figures, and in which.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Extendable masts are needed for a variety of applications, including deployable antenna systems for use on spacecraft. In some scenarios, the extendable masts can serve as booms for supporting antennas and/or various other equipment relating to a particular spacecraft mission. In other scenarios, deployable masts can comprise a part of a deployable reflector for directing radio frequency energy into a desired pattern.

One conventional type of reflector that makes use of an extendable mast is a hoop column reflector type system, which is also known as a high compaction ratio (HCR) reflector. An example of an HCR reflector is described in U.S. Pat. No. 9,608,333, the disclosure of which is incorporated herein by reference. Tension based deployable structures such as the HCR require compact, low mass deployable masts which serve as compressive structural members. Similarly, satellite deployable reflectors require long extendible booms with small stowed packages to provide satellite offsets and/or deployed compressive members. Telescoping masts offer advantageous stowed packaging due to nested configuration and are therefore well suited for space-based applications. However, these telescoping mast systems must offer low mass, dimensional stability once deployed, repeatable results, and must facilitate high compressive capability.

Figures 1A, 1B:
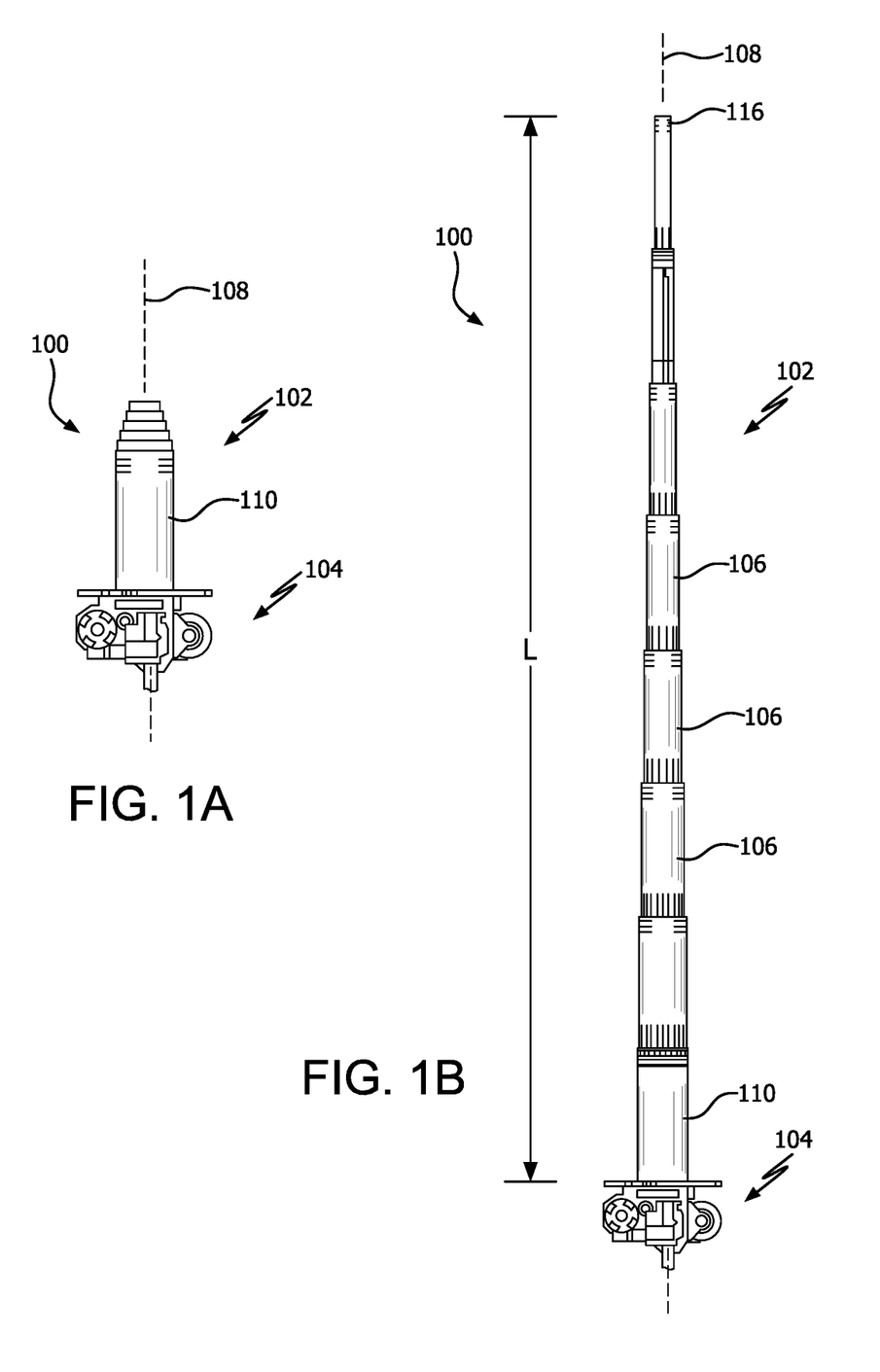
FIGS. 1A and 1B are a series of drawings which are useful for understanding a precision extensible telescoping mast assembly.
Figure 2:
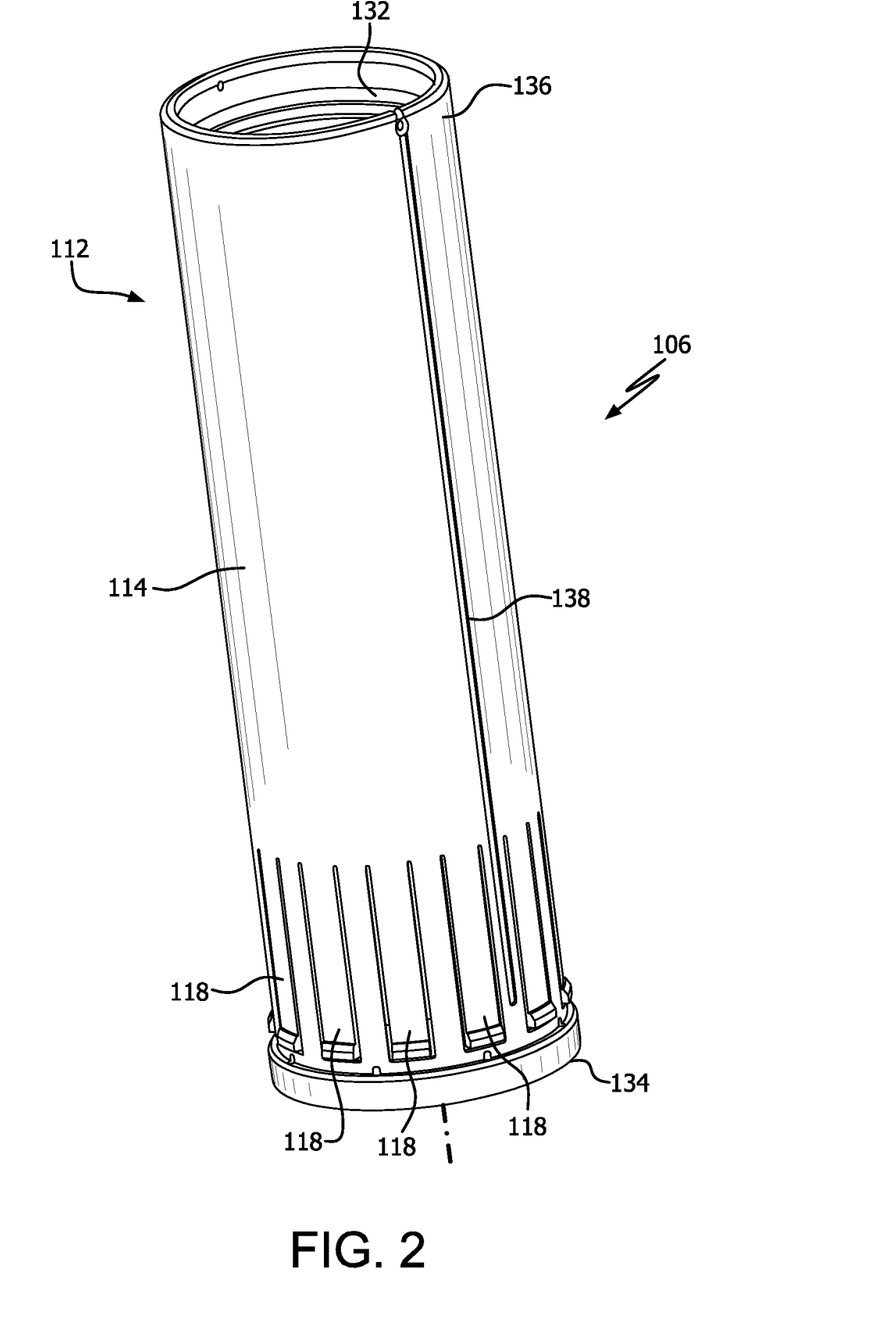
FIG. 2 is a drawing that is useful for understanding certain aspects of a mast section which can be used in the telescoping mast assembly of FIG. 1.
Figure 3:
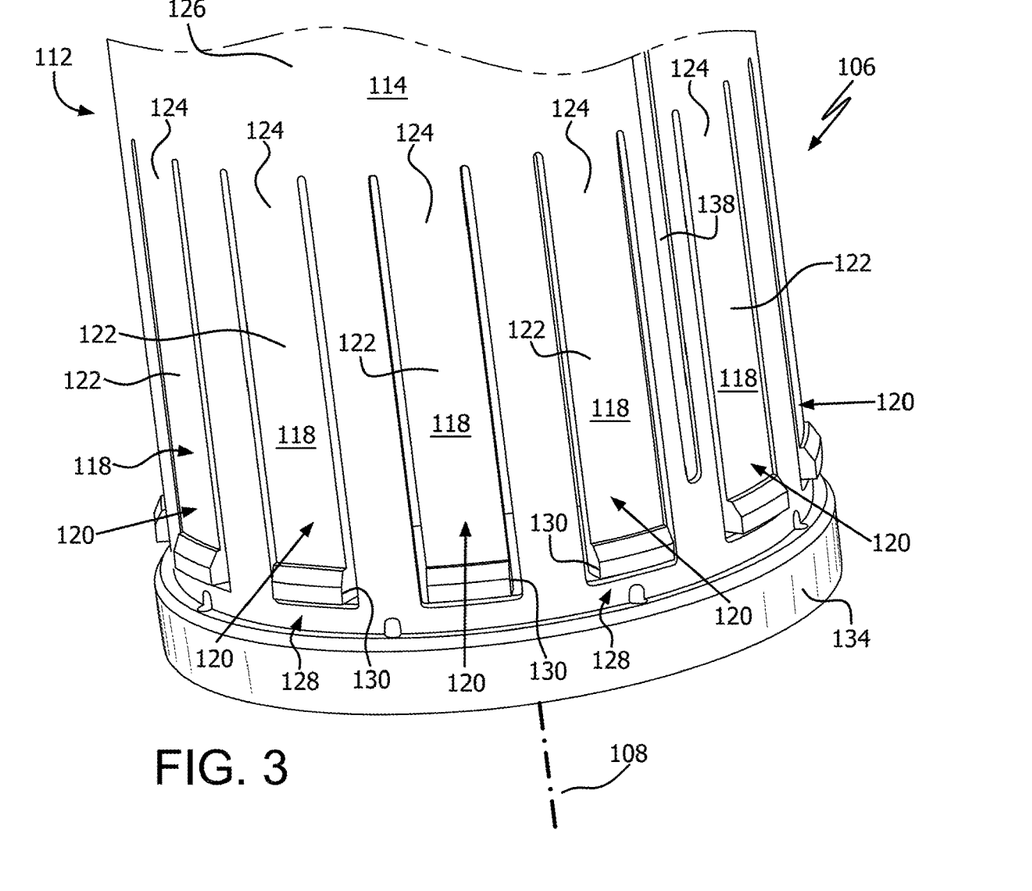
FIG. 3 is a drawing that is useful for understanding certain details of a latching system provided on a base portion of in a mast section.

A solution for a precision extensible telescoping mast assembly 100 is shown in FIGS. 1A and 1B (collectively referred to herein as FIG. 1). The mast assembly includes a mast 102 and associated deployment mechanism or drive system 104. The mast 102 is advantageously comprised of a plurality of telescoping mast sections 106. When assembled as part of a mast 102, the individual mast sections 106 are coaxially aligned with a mast axis 108 and extend from a mast base 110. As shown in FIG. 2, each mast section 106 extends from a base end 134 to a tip end 136, and is comprised of an elongated tubular member 112 defined by a sidewall 114. In some scenarios, the sidewall 114 is formed of a material such as a metal alloy, a composite, a thermoplastic and/or a fiber-reinforced polymer (FRP). Tube members of progressively smaller cross-section can be used to form the mast sections so that the overall shape of the mast 102 is somewhat tapered from the mast base 110 to the mast tip 116. In some scenarios, individual mast sections 106 can also be somewhat tapered with regard their cross-section.

When the mast 102 is in a stowed condition shown in FIG. 1A, the mast sections 106 are compactly disposed in a nested configuration with respect to others of the plurality of mast sections 106. Each mast section 106 is configured to allow it to slide relative to an adjacent mast section, along a direction aligned with the mast axis 108. This sliding action can facilitate a transition of the mast from the stowed condition shown in FIG. 1A, to a deployed condition shown in FIG. 1B. Further, this sliding action can be facilitated by the drive system 104. When the drive system is activated it will urge the mast sections 106 from the stowed condition to the deployed condition. When in the fully deployed condition shown in FIG. 1B, adjacent ones of the mast sections 106 are disposed substantially end to end so as to form a mast having an elongated length L extending from a mast base 110 to a mast tip 116.

Details of the mast 102 will now be discussed with reference to FIGS. 2-6. Each of the mast sections 106 includes one or more latches 118 which are provided in proximity to the base end 134 of the mast section. In some scenarios, a plurality of the latches 118 can be distributed circumferentially around the base end of the tube member 112. According to one aspect, the latches 118 can be integrally formed from a portion of the tube member 112. For example, each latch 118 can be integrally formed from a portion of the sidewall 114. The arrangement of each latch is advantageously chosen so that the portion of the sidewall 114 that forms the latch will resiliently deflect when a bias force is applied thereto. The latch will spring back to the unbiased position shown in FIG. 3 when the bias force is removed. As explained below in further detail, the resilient deflection of the latches as described herein can be configured to facilitate engagement of the latch with a portion of an adjacent mast section, whereby adjacent mast sections can be locked in place, end to end.

In the solution shown in FIGS. 2-6, each of the latches 118 is configured to deflect in a direction 120 that is transverse with respect to the mast axis 108. For example, in some scenarios the one or more latches can be configured to deflect in a substantially radial direction with respect to the mast axis. The one or more latches 118 can be configured in various different ways to facilitate the resilient deflection action described herein. For example, in some scenarios the one or more latches 118 can comprise a flexure member, that is formed in such a way so as to allow the portion of the side wall comprising the latch to resiliently bend or move in response to an applied bias force.

The exact configuration of the flexure member is not critical. However, in some scenarios a flexure member 122 can be comprised of an elongated structural element. In such a scenario, the flexure member 122 can be joined to a major portion 126 of the sidewall 114 at a flexure base 124. As best understood with reference to FIG. 3, the flexure member 122 is separated or cut away from the sidewall 114 along the elongated length thereof and comprises a tip end 128 opposed from the flexure base 124. According to one aspect, the flexure member 122 is oriented so that its elongated length from the flexure base 124 to the tip end 128 will extend in a direction toward the mast base. In some scenarios, the elongated length of the flexure member 122 can extend in a direction which is in parallel alignment with the mast axis 108.

Figure 4:
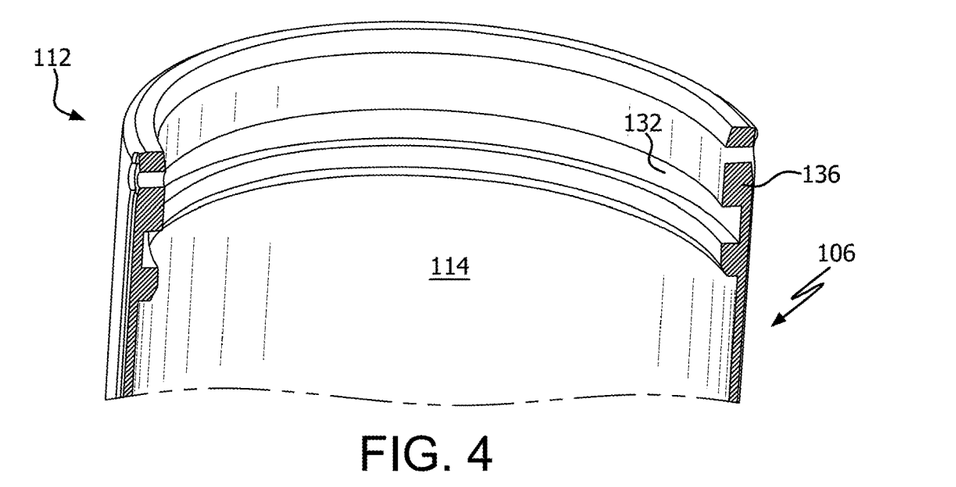
FIG. 4 is a cross-sectional drawing that is useful for understanding certain details of an engagement recess which can be used to facilitate the latching system.
Figure 5:
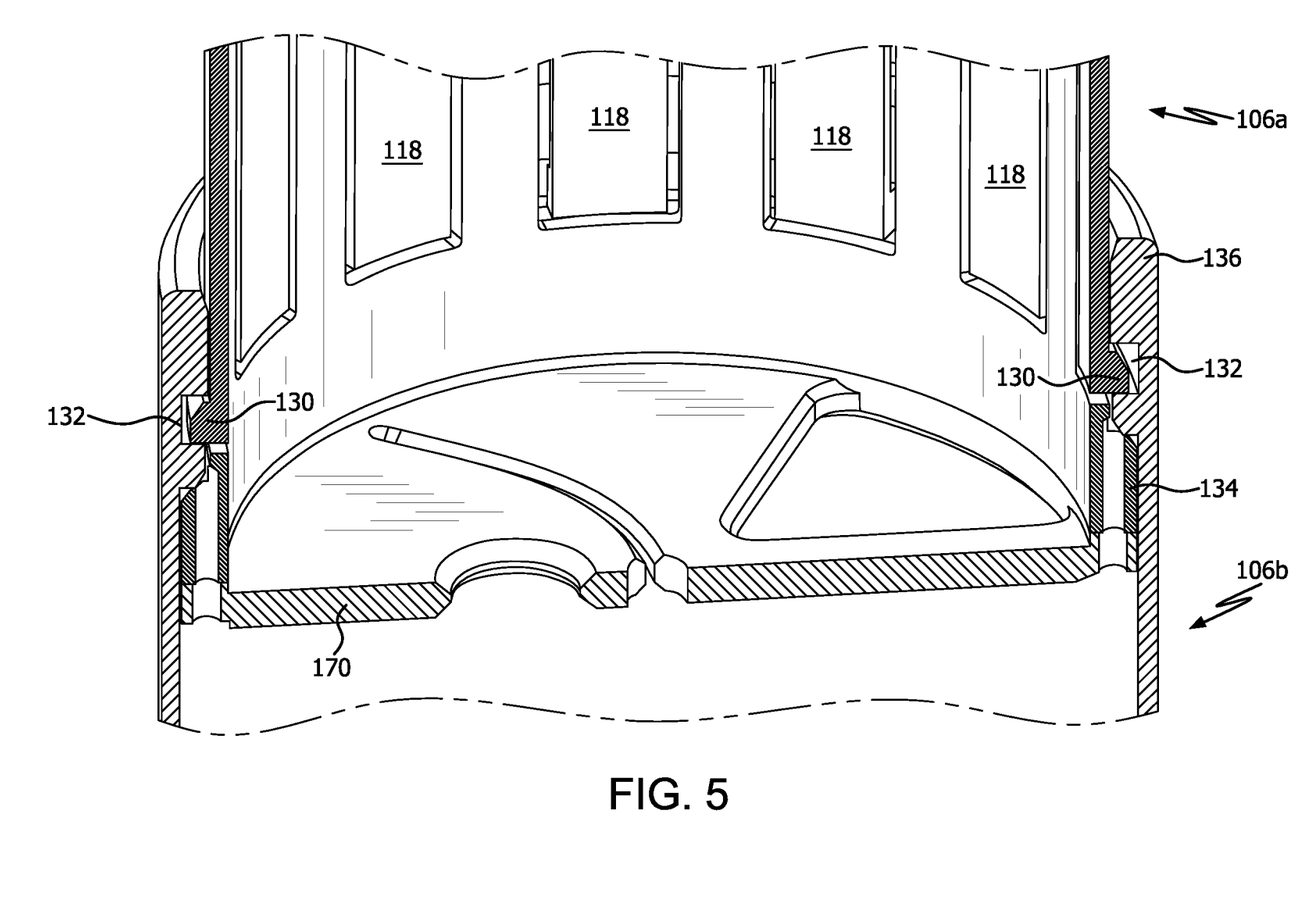
FIG. 5 is a drawing that is a cross-sectional view of a portion of a mast that is useful for understanding how a first mast section can be locked in position with respect to a second mast section when the mast is extended.

The latch 118 includes a raised nub 130. This nub is sized and shaped so that it can be received within an engagement recess 132 of an adjacent mast section positioned closer to the mast base. The engagement recess is shown in FIG. 4 as comprising a channel or groove which extends circumferentially around a tip end of an interior of each mast section 106. However, this aspect of the solution is not critical and it should be understood that other configurations of the engagement recess are also possible. For example, in place of a continuous channel or groove extending around the tip end of the mast section, there could instead be provided a plurality of individual engagement recesses for the one or more latches. As explained below in further detail, the latches 118 are configured to automatically secure a base end 134 of each of the mast sections 106 to a tip end 136 of an adjacent mast section when the mast is transitioned to the deployed condition. This concept is best understood with reference to FIG. 5 which shows a first mast section 106a secured in a second mast section 106b when fully extended.

Figure 6A:
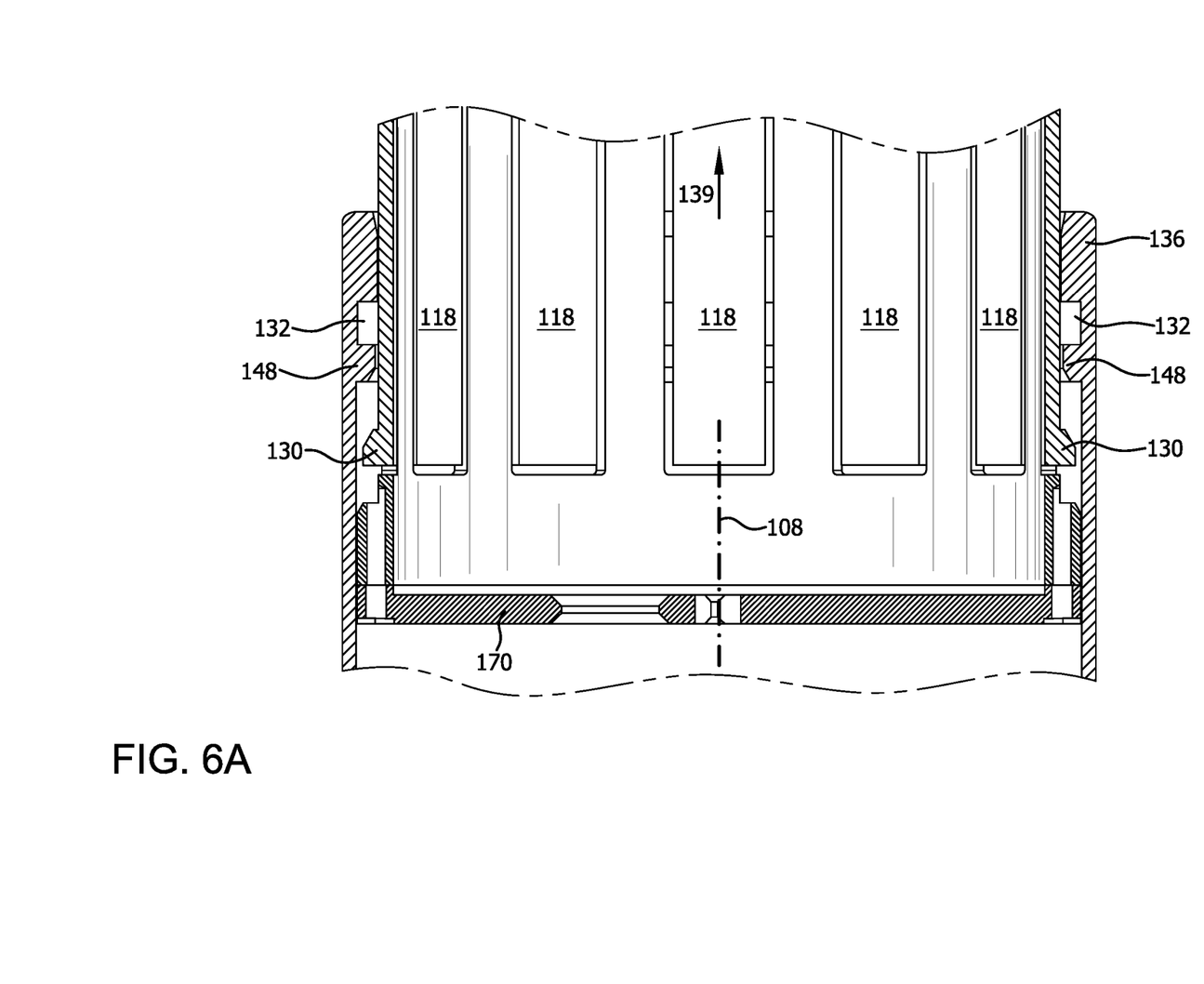
FIGS. 6A-6D are a series of cross-sectional drawings that are useful for understanding the operation of a mast section latching system.
Figure 6B:
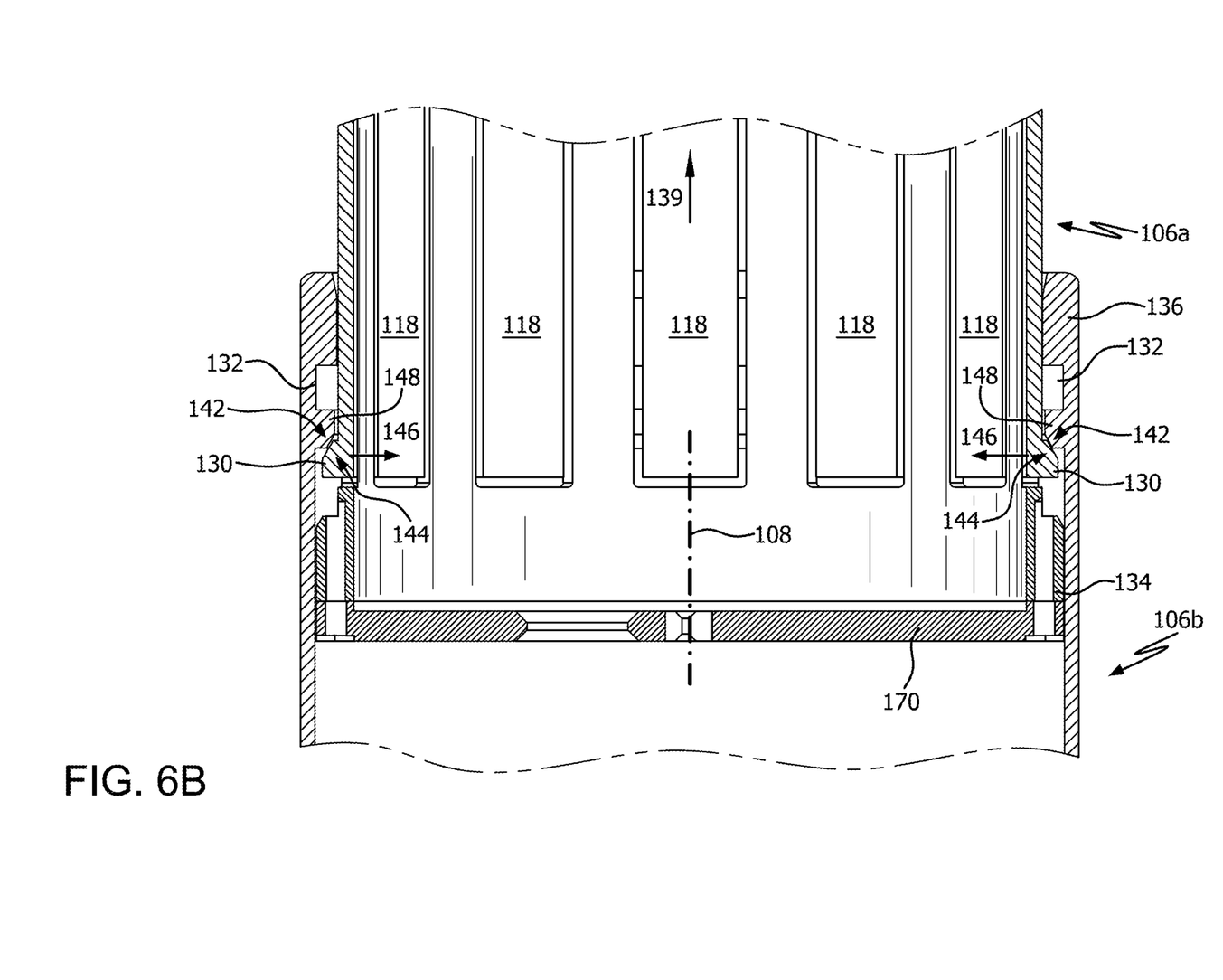

An example of a latching operation will now be described in further detail with respect to FIGS. 6A-6D. In FIG. 6A the first mast section 106a is shown moving in direction 139 as it is approaching a fully extended condition with respect to the second mast section 106b, but the latching operation has not yet begun. In FIG. 6B, a chamfered edge 144 of the nub 130 begins to engage a deflection actuator face 142 of the second mast section 106b, causing the nub to begin deflecting in direction 146, toward the mast axis 108. As the first mast section 106a continues to move relative to the second mast section 106b, the nub 130 of each latch 118 will continue to deflect in direction 146 until the nub 130 is able to move past the lower ridge 148 of the engagement recess 132.

Figure 6C:
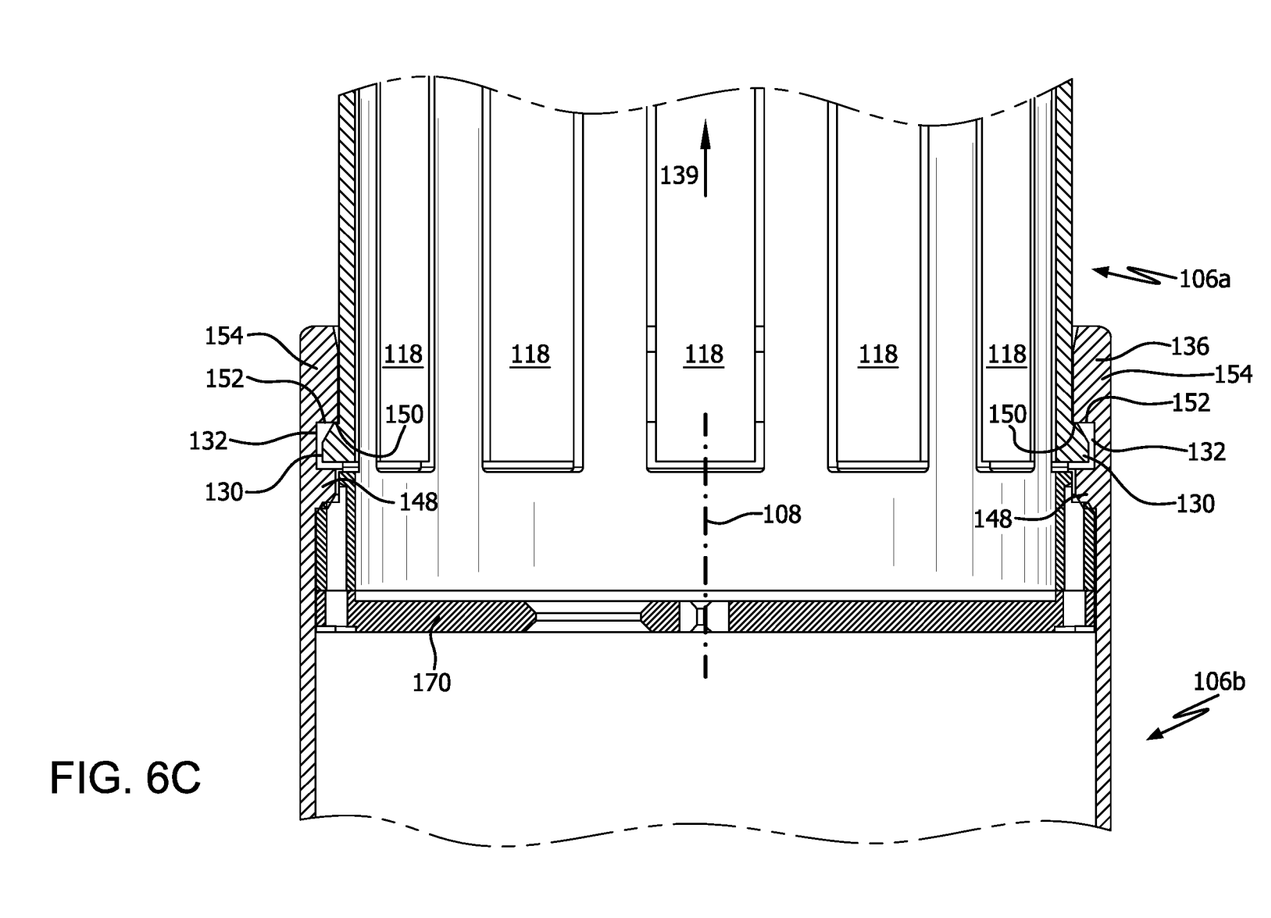

Once the nub 130 moves past the lower ridge 148, the nub will resiliently spring back toward its unbiased condition and will seat within the engagement recess 132 as shown in FIG. 6C. Due to a certain small amount of clearance space provided within the engagement recess 132, the first mast section can continue to move a slight distance in direction 139 after the nub 130 is seated within the engagement recess. This movement will allow a stop face 150 provided on a portion of the nub 130 to engage a catch 152 formed on an upper ridge 154 of the engagement recess. The engagement of the stop face with the catch will prevent further movement of the first mast section 106a in the direction 139.

Figure 6D:
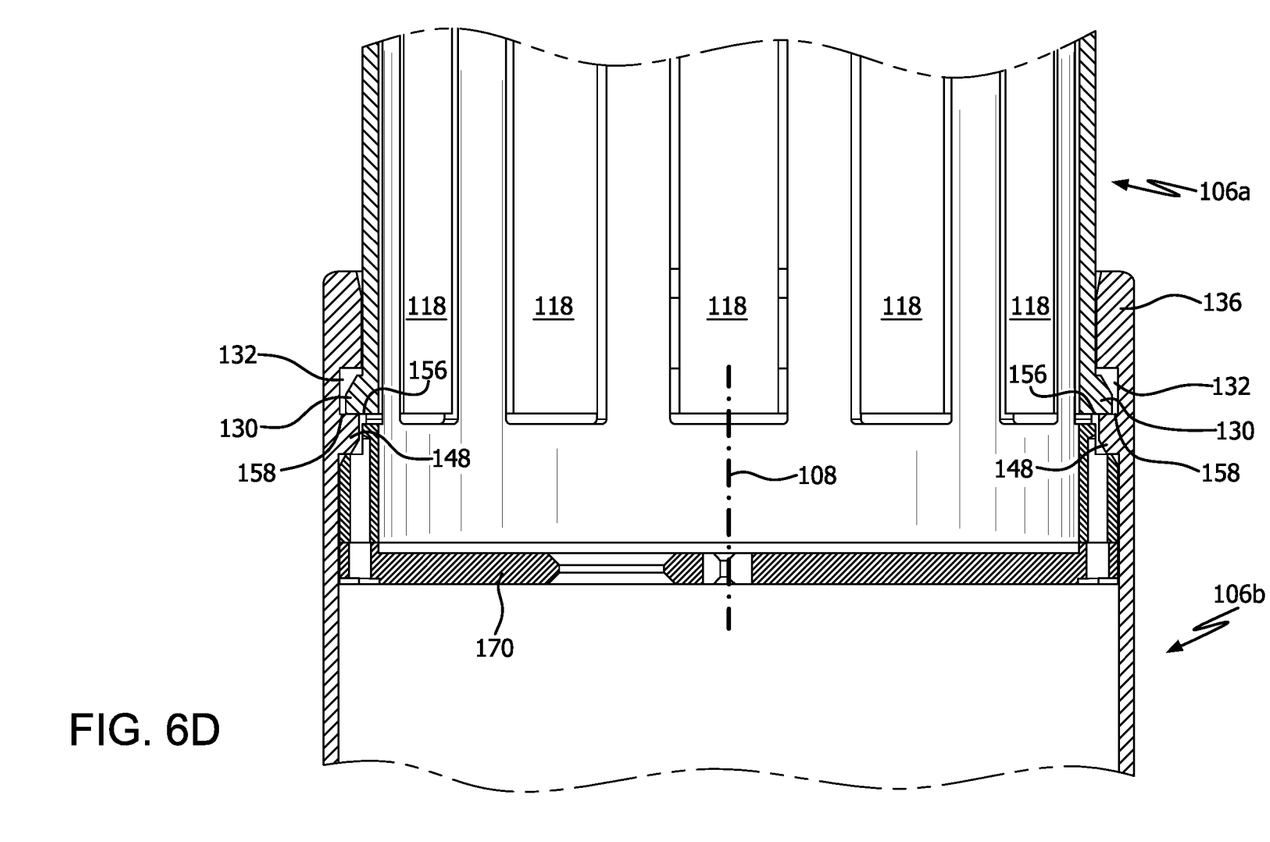

When a drive force exerted by the mast drive mechanism is discontinued or removed, the first mast section 106a can return to a resting position shown in FIG. 6D. When in this condition, a compression face 156 formed on a portion of the nub 130, will engage a shoulder 158 formed on the lower ridge 148. When all of the mast sections are locked in place in this way, the mast will facilitate a rigid compressive member that has precise predetermined overall length L, and will have high compressive capability.

Figure 7:
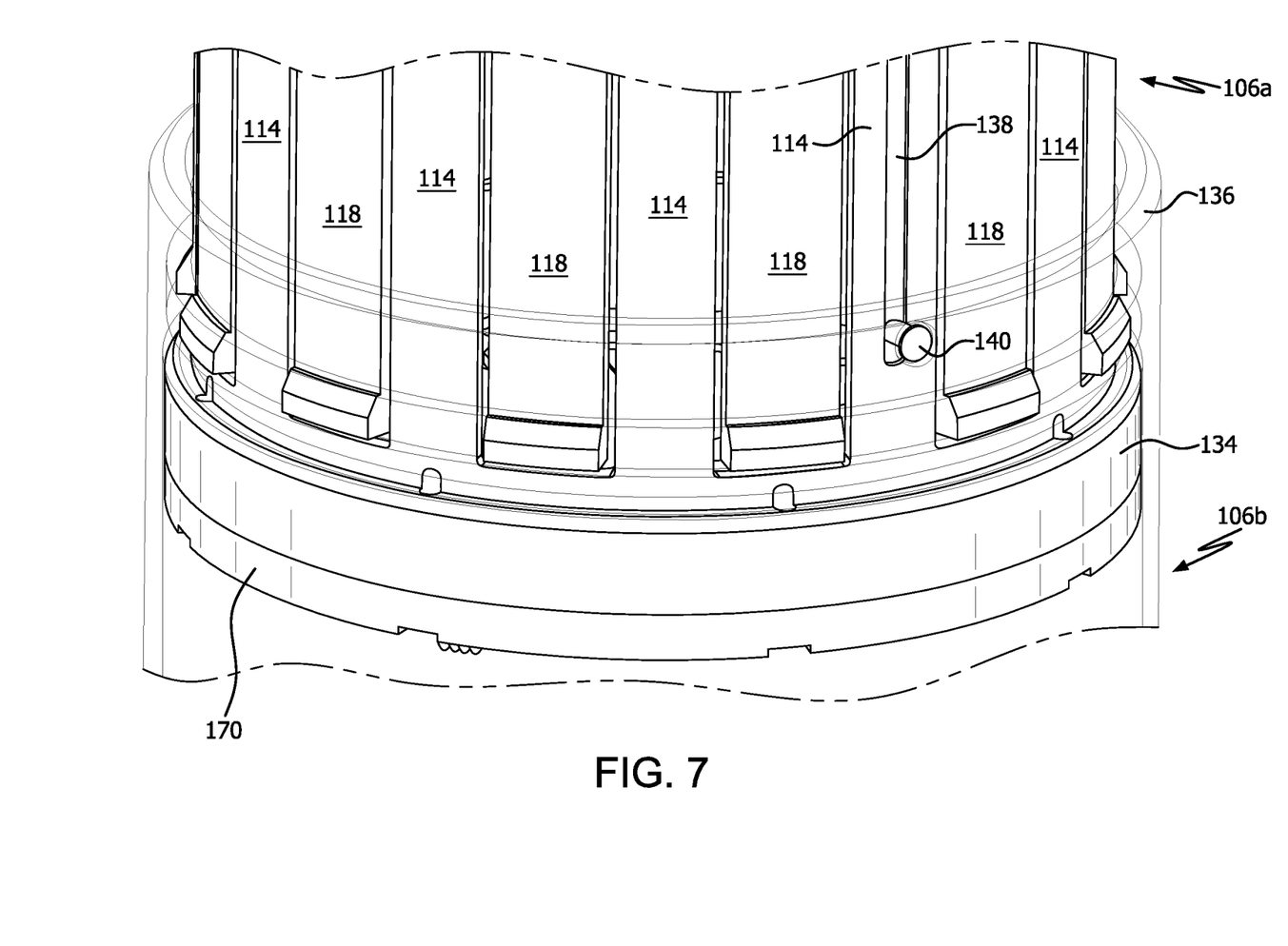
FIG. 7 is a drawing that is useful for understanding how a clocking mechanism can prevent axial rotation of one or more of the mast sections.

Each mast section can include a suitable clocking mechanism to ensure that the individual mast sections 106 remain in proper alignment with each other as the mast 102 is extended. The exact configuration of the clocking mechanism is not critical provided that it ensures that the individual mast sections do not rotate in an uncontrolled way about the mast axis 108. For example, a clocking mechanism in some scenarios can include at least one clocking groove 138 and a corresponding clocking guide structure 140. In some scenarios, the clocking guide structure can comprise a pin fixed in the sidewall which of an adjacent mast section. The clocking groove 138 can be disposed on a face of the sidewall 114, and can extend in a direction substantially aligned with the mast axis. As shown in FIG. 7, a clocking groove 138 of a first mast section 106a can be configured to receive a clocking guide structure 140 fixed in an adjacent second mast section 106b. The clocking guide structure 140 prevents the first mast section 106a from rotating about the mast axis with respect to the second mast section 106b. Consequently, the mast 102 can be extended, and the mast sections can slide relative to each other, without undesired rotation of the mast sections. Other types of clocking mechanisms are also possible, such as an interlocking tongue and groove configuration, whereby interlocking tongue and groove structures are respectively formed on the first and second locking mechanism.

The mast 102 can be urged from its stowed configuration to its extended configuration using any suitable type of drive system. According to one aspect, the drive system for the mast can comprise a spoolable extensible member (SEM). SEMs are well-known in the art and therefore will not be described here in detail. However, it will be appreciated that an SEM can comprise any of a variety of deployable structure types that can be flattened and stowed on a spool for stowage, but when deployed or unspooled will exhibit beam-like structural characteristics whereby they become stiff and capable of carrying bending and column loads. Deployable structures of this type come in a wide variety of different configurations. Examples of conventional SEMs include slit-tube or Storable Tubular Extendible Member (STEM), Triangular Rollable and Collapsible (TRAC) boom, Collapsible Tubular Mast (CTM), and so on. The drive system can also include a spool on which the SEM is rolled when stowed. This spool can be rotated by a motor, such as an electric motor. The rotation of the spool dispenses the SEM, after which the SEM will conform to its rigid deployed state as it extends from the base structure.

Figure 8:
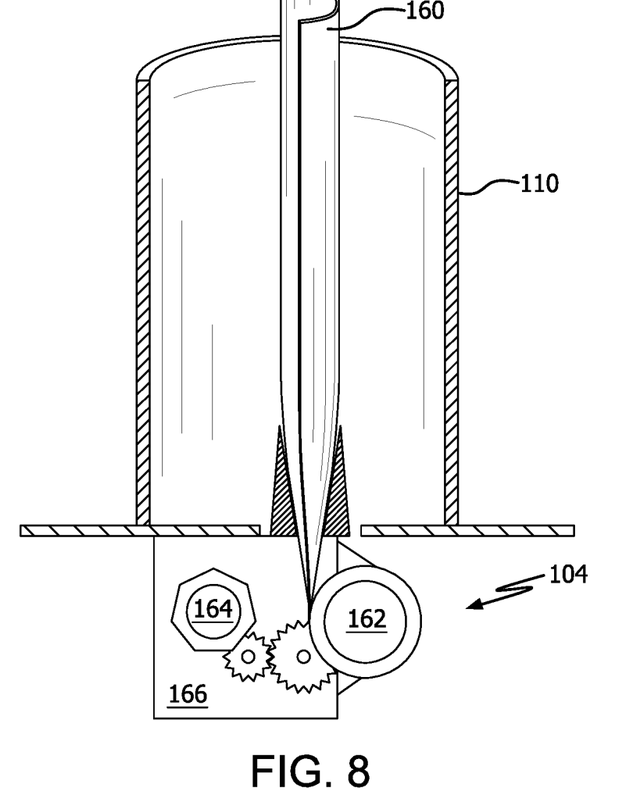
FIG. 8 is a cross-sectional view of a mast base that is useful for understanding how a spoolable extensible member (SEM) can be used in the telescoping mast assembly.

Referring now to FIG. 8 a drive system 104 is shown in which an SEM 160 is used to urge the mast to its extended configuration. A major portion of the SEM 160 is rolled tightly in its flattened condition around a spool 162 when the mast 102 is in the stowed condition shown in FIG. 1A. When deployed or unspooled, the SEM reverts to its deployed configuration (e.g., curved when viewed in cross-section) to achieve beam-like structural characteristics whereby it becomes stiff and capable of carrying a column load. The spool 162 can be coupled to a motor (e.g., an electric motor) 164 through a suitable drive train 166 which may comprise for example gears, belts and/or pulleys to couple the rotational force of the motor to the spool. According to one aspect, the SEM can extend through an interior of the mast base 110 and through the interior of each mast section 106. Accordingly, when the SEM 160 is unspooled it will urge each mast section to slide toward the extended configuration shown in FIG. 1B.

Figure 9:
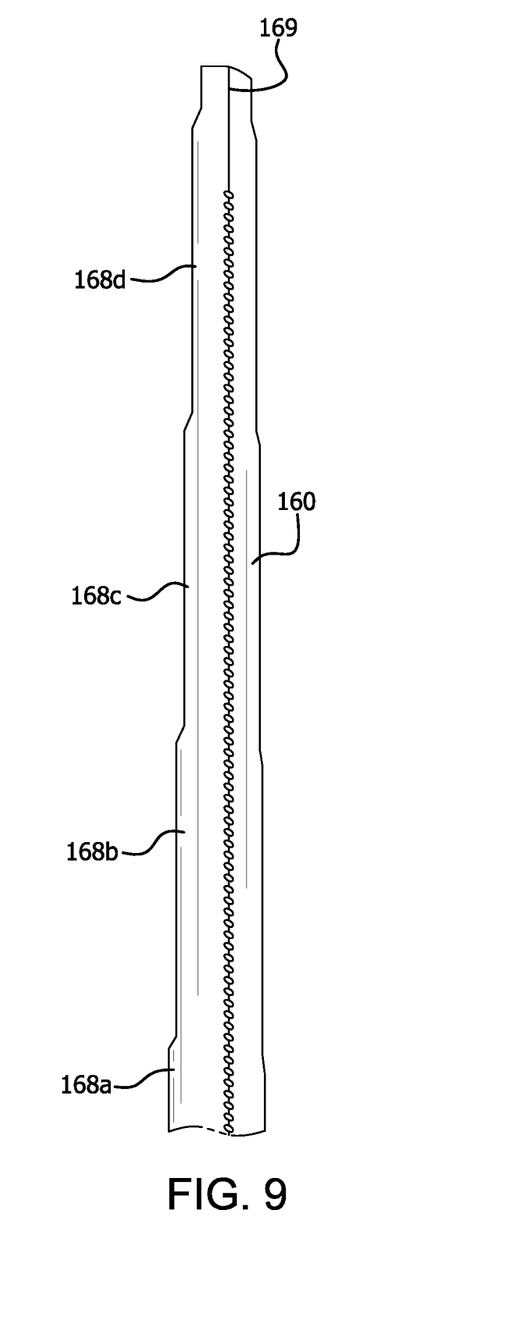
FIG. 9 is a drawing which is useful for understanding a tapered configuration of an SEM.

The SEM shown in FIGS. 8 and 9 is presented as one example of an SEM that can be used to facilitate deployment of the mast 102. However, it should be understood that the solution described herein is not limited with regard to the particular type of SEM that is used. Further, although a single SEM can be used to facilitate deployment, there are other scenarios in which it can be advantageous to make use of more than one SEM. For example, greater structural rigidity may be possible with two or more SEMs as compared to a single SEM. Thus, in an exemplary arrangement, the drive system for the mast can include a first SEM and a second SEM. The first SEM and the second SEMs can be deployed concurrently to facilitate the transition from the stowed condition to the deployed condition. If more than one SEM is used in this way, they may be deployed back to back or in a nested configuration depending on the particular application.

In some scenarios, the mast 102 can have a tapered configuration when extended, whereby a cross-section of each mast section 106 can be reduced relative to each adjacent section along a length of the mast in a direction from the mast base 110 to the mast tip 116. The result is that less space can be available within each mast section approaching the tip. To accommodate the SEM within the interior of each mast section 106 it can be advantageous to taper the width of the SEM 160 along its length as shown in FIG. 9. In such scenarios, the SEM can comprise a plurality of taper sections 168a, 168b, 168c, 168d. The resulting SEM has an elongated length that is tapered in width from a base end to a tip end. Each of these taper sections can extend along a corresponding length of a particular one of the mast sections 106 within which it is designed to fit. A tapered end portion 169 of the SEM can be secured in the tip end 116 of the mast assembly whereby extension of the SEM 160 urges the mast 102 to transition from the stowed configuration shown in FIG. 1A to the deployed configuration shown in FIG. 1B.

Figure 10:
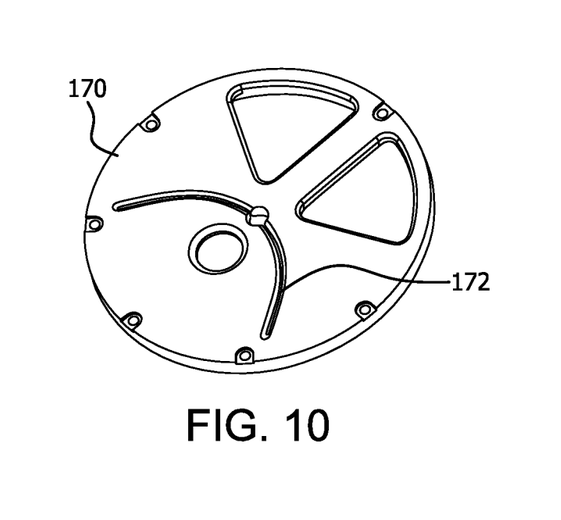
FIG. 10 is a drawing that is useful for understanding a batten that can be used to prevent buckling of the SEM within the mast assembly.
Figure 11:
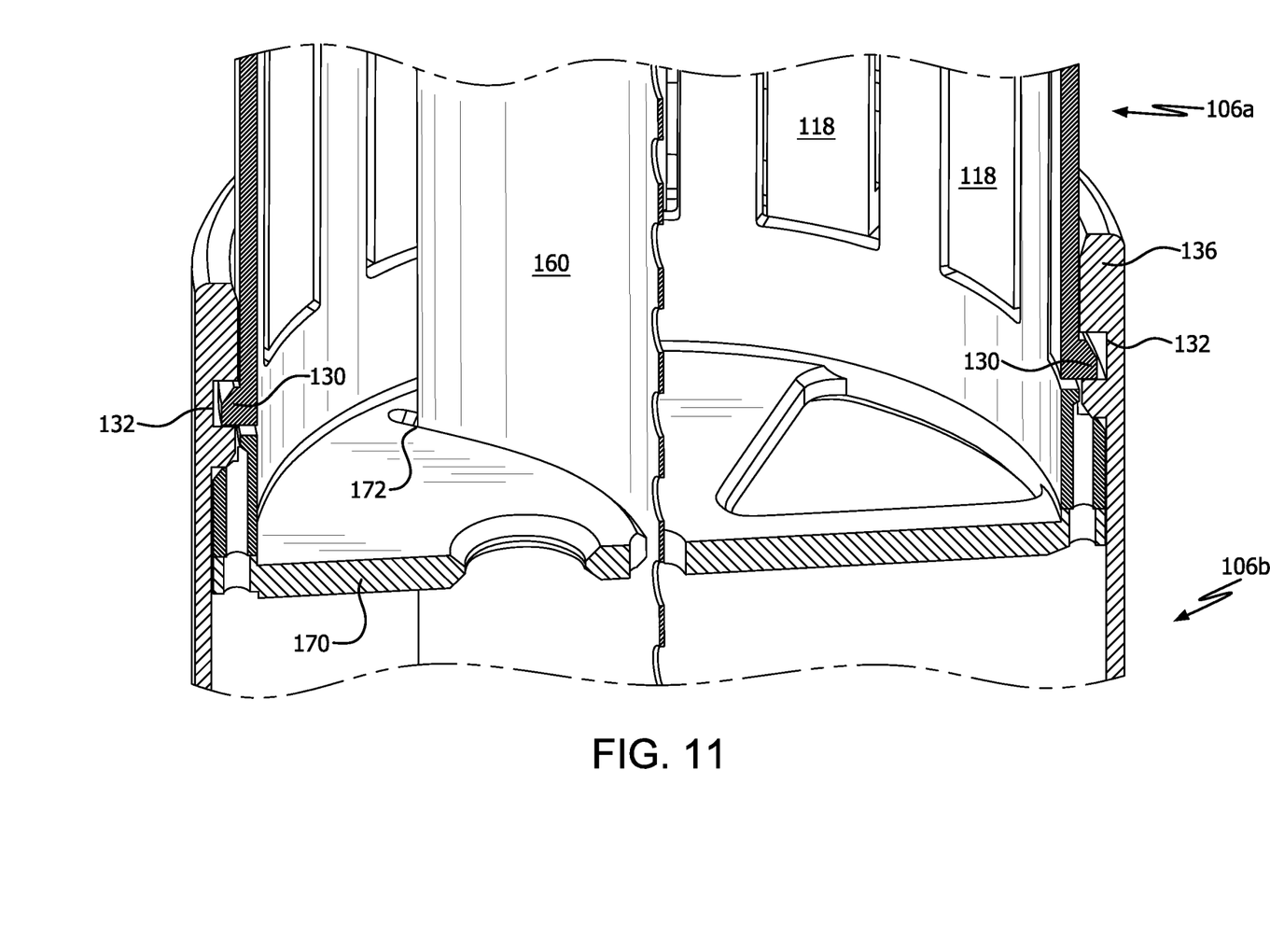
FIG. 11 is a cross-sectional view of a portion of a mast that is useful for understanding an arrangement of a batten and an SEM within the mast assembly.

An elongated SEM 160 can sometimes be prone to buckling or bending as column forces are increased. To help prevent the occurrence of such buckling, each of the mast sections 106 can be provided with one or more battens through which the SEM extends. An example of such a batten 170 is shown in FIG. 10. The batten is a structural element which is disposed within each mast section 106. The battens 170 advantageously extend transverse to the mast axis 108 and include an aperture 172 of a predetermined shape formed therein. The predetermined shape is chosen to correspond to a cross-sectional shape of the SEM 160 when deployed. In FIG. 11 the SEM 160 is shown extending through a batten 170 in a first mast section 106a, which is locked in place to a second mast section 106b. In the scenario shown in FIG. 10, the batten is disposed at a base end of the mast section and may be secured in place by one or more fasteners (not shown). However, the solution is not limited in this regard and other scenarios are also possible. For example, in some scenarios the batten 170 may be integrally formed with the mast section. In some scenarios, more than one batten can be provided along a length of each mast section 106. Also, the batten(s) 170 can be disposed in locations along the length of the mast section other than at the base 134.

The mast system 100 disclosed herein can be suitable for various different applications where a high precision compression member is required. For example, the mast system can comprise a part of a deployable tensioned structure in which the mast is configured as a compression member of the structure. An example of a deployable tensioned structure is shown in FIG. 12.

Figure 12:
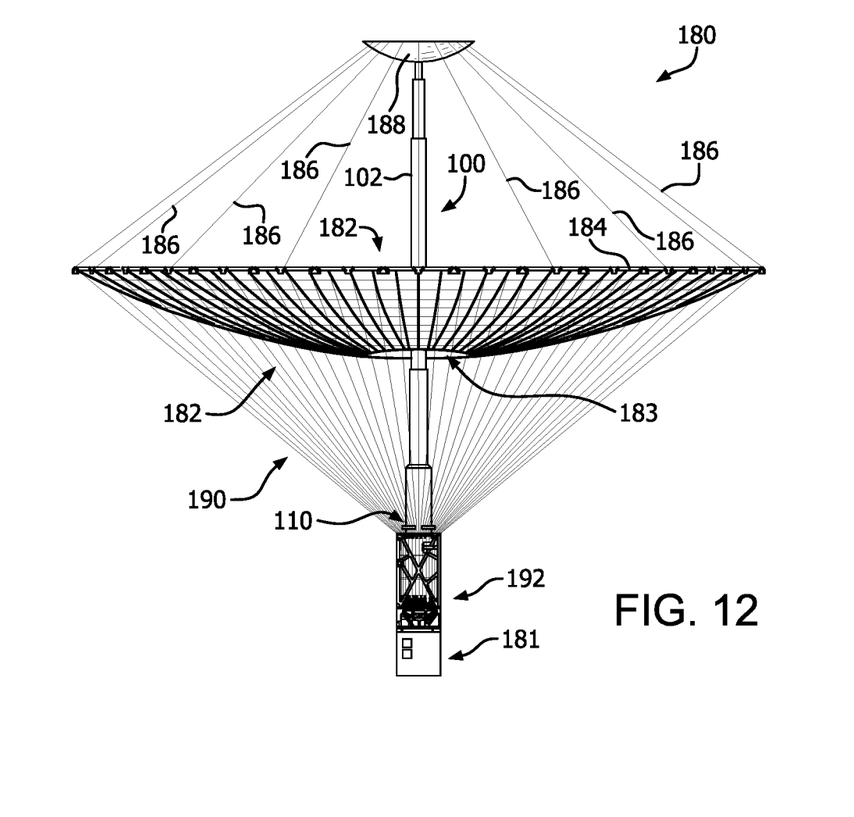
FIG. 12 is a drawing that is useful for understanding how a precision telescoping mast can be used to facilitate a type of reflector system.
Figure 13:
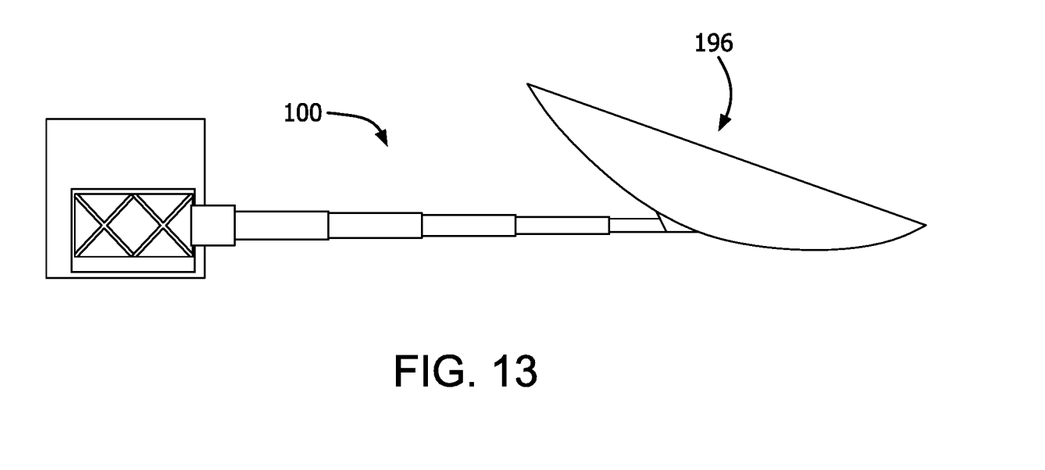
FIG. 13 is a drawing that is useful for understanding how a precision telescoping mast described herein can be used to facilitate a boom in a deployable satellite antenna system.

In the example shown in FIG. 12, the mast 102 functioning as a compression member, is configured to facilitate a deployable mesh reflector 180 as part of an antenna system for a spacecraft 181. The deployable mesh reflector 180 is formed of a collapsible mesh reflector surface 182 supported by a circumferential hoop assembly 184. The mast 100 extends along a central axis of the reflector 180 through an opening or aperture formed in the reflector surface 182. The hoop assembly 184 is supported by the mast assembly 100 with a plurality of cords 186. In this example a subreflector 188 is secured to the tip end of the mast. A further network of cords 190 can extend between a reflector system housing 192 and the mesh reflector 182 to help define the shape of the mesh reflector surface. The hoop assembly 184 and the mast assembly 100 can be configured to collapse into a stowed configuration which fits within the interior space of the housing 192. It should be understood that the deployable mesh reflector 180 is provided as merely one possible example of a deployable tensioned structure. The mast system disclosed herein can be used in any type of deployable tensioned structure, whether now known or known in the future. FIG. 13 shows an alternative scenario in which the mast 100 is used as a boom to support a radio frequency reflector 196.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:
1. An extensible mast comprising:
a plurality of mast sections coaxially aligned along a mast axis, each mast section comprising an elongated tubular member defined by a sidewall and disposed in a nested configuration with respect to others of the plurality of mast sections when in a stowed condition;
each mast section configured to slide along a direction aligned with the mast axis to facilitate a transition from the stowed condition to a deployed condition in which adjacent ones of the mast sections are disposed substantially end to end so as to form the mast having an elongated length extending from a mast base to a mast tip; and
a drive system configured to urge the mast sections from the stowed condition to the deployed condition;
wherein each of the mast sections includes one or more latches, each formed from a portion of the sidewall that is configured to resiliently deflect to facilitate engagement of the latch with a portion of an adjacent mast section.

2. The extensible mast according to claim 1, wherein the one or more latches are configured to automatically secure a base end of each of the mast sections to a tip end of an adjacent mast section when the mast is transitioned to the deployed condition.

3. The extensible mast according to claim 1, wherein each of the one or more latches is configured to deflect in a direction transverse with respect to the mast axis.

4. The extensible mast according to claim 3, wherein the one or more latches are configured to deflect in a radial direction with respect to the mast axis.

5. The extensible mast of claim 3, wherein each latch is comprised of a nub which is configured to be received within an engagement recess defined in the adjacent mast section when the mast is in the deployed condition.

6. The extensible mast of claim 3, wherein each mast section further comprises at least one clocking groove disposed in the sidewall and extending in a direction substantially aligned with the mast axis, the clocking groove configured to receive a clocking guide structure fixed in the adjacent mast section.

7. The extensible mast of claim 3, wherein each of the one or more latches is comprised of a flexure member which is joined to a major portion of the sidewall at a flexure base thereof, the flexure member cut away from the major portion of the sidewall along an elongated length thereof and having a tip end opposed from the base.

8. The extensible mast of claim 7, wherein the flexure member is oriented so that its elongated length from the flexure base to the tip end extends toward the mast base.

9. The extensible mast of claim 1, wherein the drive system is comprised of a spoolable extensible member (SEM).

10. The extensible mast of claim 9, wherein the plurality of mast sections each comprise one or more battens through which the SEM extends, each said batten comprising a structural member fixed to the mast section and disposed transverse to the mast axis, the batten having an aperture of a predetermined shape corresponding to a cross-sectional shape of the SEM when deployed.

11. The extensible mast of claim 9, wherein the SEM has an elongated length that is tapered in width from a base end to a tip end.

12. The extensible mast of claim 11, wherein the plurality of mast sections each comprise a progressively smaller cross-section from the mast base to the mast tip, and the tapered width of the SEM is configured to allow the SEM to fit within each of the mast sections of progressively smaller cross-section.

13. The extensible mast of claim 9, wherein the drive system is configured to transition the SEM from a stowed condition in which the SEM is rolled on a spool to a deployed condition in which the SEM is unrolled from the spool.

14. The extensible mast of claim 9, wherein the SEM is comprised of a first SEM and a second SEM.

15. The extensible mast of claim 14, wherein the first SEM and the second SEMs are deployed concurrently to facilitate the transition from the stowed condition to the deployed condition.

16. A deployable tensioned structure comprising the mast of claim 1, wherein the mast is a compression member configured to support column loading along the mast axis.

17. The deployable tensioned structure of claim 16, wherein a plurality of cords are attached to the mast base and the mast tip, and the cords are configured to support a flexible radio frequency reflector surface.

18. A reflector system comprising the mast of claim 1, wherein the mast is a boom configured to support a radio frequency reflector.

19. A method for deploying an extensible mast comprising:
arranging a plurality of mast sections coaxially in alignment along a mast axis, each mast section comprising an elongated tubular member defined by a sidewall;
disposing the plurality of mast sections in a nested configuration with respect to others of the plurality of mast sections when the mast is in a stowed condition;
using a drive system to urge each mast section to slide along a direction aligned with the mast axis to facilitate a transition of the mast from the stowed condition to a deployed condition in which adjacent ones of the mast sections are disposed substantially end to end so as to form a mast having an elongated length extending from a mast base to a mast tip;
retaining the plurality of mast sections in the deployed condition by using one or more latches, each formed from a portion of the sidewall; and
causing each of the one or more latches to resiliently deflect to facilitate engagement of the latch with a portion of an adjacent mast section.

20. The method of claim 19, further comprising using the latches to automatically secure a base end of each of the mast sections to a tip end of an adjacent mast section when the mast is transitioned to the deployed condition.

21. The method of claim 19, wherein each of the one or more latches is resiliently deflected in a direction transverse with respect to the mast axis.

* * * * *